move it to present the work to the grinding-surface, and means to automatically assume control of the work-holder after such movement and to control the subsequent bodily movement thereof during the completion of the grinding operation.

6. In a grinding-machine, a rotatable grinding-surface, means to automatically reciprocate it bodily, a work-holder, means to move it to present the work to the grinding-surface, means to thereupon automatically assume control of and govern subsequent movement of the work-holder during the grinding operation, and a device to automatically release the work-holder from the control of said automatic means when a predetermined movement of the work-holder has been effected thereby.

7. In a grinding-machine, a grinding-surface, and a work-holder, means to effect their relative movement to present the work to the grinding-surface, automatic means to thereupon assume control of and govern such relative movement during the grinding operation, and a device to automatically render said latter means inoperative when a predetermined relative movement of the grinding-surface and work-holder has been effected by said automatic means.

8. In a grinding-machine, a rotatable grinding-surface, means to reciprocate it bodily, a work-holder, manually-operated means to move it to present the work to the grinding-surface, automatic means to thereupon assume control of and govern subsequent movement of the work-holder, to give the requisite shape to the work, and a device to automatically release the work-holder from the control of said automatic means when by a predetermined movement of the work-holder the desired grinding has been effected.

9. In a grinding-machine, a rotatable grinding-surface, means to bodily reciprocate the same, a rotatable work-holder bodily movable about a fulcrum at right angles to its axis of rotation, means to move it about such fulcrum to present the work to the grinding-surface, automatic means to thereupon assume control of and govern subsequent bodily movement of the work-holder to complete the grinding, a device to automatically release the work-holder from the control of said automatic means, and a spring to return the work-holder to inoperative position when so released.

10. In a grinding-machine, a rotatable grinder having a flat grinding-surface, means to bodily reciprocate the grinder, a work-holder, manually-operated means to move it in a lateral path to present the work to the grinding-surface at an angle thereto, automatic means to thereupon assume control of the work-holder and change the angle of presentation of the work during grinding, to give the requisite shape to the work, and a device to automatically release the work-holder from such control when a predetermined automatic movement of the work-holder has been effected.

11. In a grinding-machine, a rotatable grinder having a flat, annular grinding-surface, means to reciprocate the grinder, a rotatable work-holder having its axis of rotation in a plane at right angles to the grinding-surface, a pivot upon which the work-holder is bodily movable, to vary the angle between the intersecting axes of rotation of the grinder and work-holder, means to move the work-holder upon its pivot to present the work to the grinding-surface, and automatic means to thereupon assume control of and govern subsequent bodily movement of the work-holder during the grinding, to advance the work and change the angle of presentation thereof to the grinding-surface, thereby giving the work the requisite shape.

12. In a grinding-machine, a rotatable grinder having a flat, annular grinding-surface, a work-holder to present the work to the grinding-surface, and means to bodily reciprocate the grinder at right angles to its axis of rotation and thereby equalize the wear upon its grinding-surface.

13. In a grinding-machine, a rotatable grinder having a flat grinding-surface, a support therefor, adapted to rock on a fulcrum parallel to the axis of rotation of the grinder, means to rock the support, and a work-holder to present the work to the grinding-surface, the reciprocation of the grinder by or through its rocking support equalizing the wear upon the grinding-surface.

14. In a grinding-machine, a rotatable shaft, a support therefor adapted to rock on a fulcrum parallel to the shaft, a grinder secured to the latter and having a flat, annular grinding-surface, means to rock the support on its fulcrum, a work-holder, and means to move it in a lateral path to present the work to the grinding-surface, the wear upon the latter being equalized by the reciprocation imparted to the grinder by rocking its support.

15. In a grinding-machine, a rotatable grinder having a flat grinding-surface, a support therefor, adapted to rock on a fulcrum parallel to the axis of rotation of the grinder, means to rock the support, a work-holder adapted to be swung in a lateral plane, to present the work to the grinding-surface, a fixed fulcrum on which the work-holder is movable, and means to adjust the grinder-support in the direction of the length of its fulcrum.

16. In a grinding-machine, a rotatable grinding-surface, a work-holder, including means to clamp the work, means to effect relative movement of the grinding-surface and the work-holder, to present the work to the former, and means actuated automatically by or through such relative movement to set the clamping means.

17. In a grinding-machine, a rotatable grinding-surface, a work-holder including a work-clamp, means to effect relative move- No. 714,037. Patented Nov. 18, 1902.
E. RÜCKGAUER.
GIN.
(Application filed Sept. 13, 1901.)
(No Model.) 2 Sheets—Sheet 2.
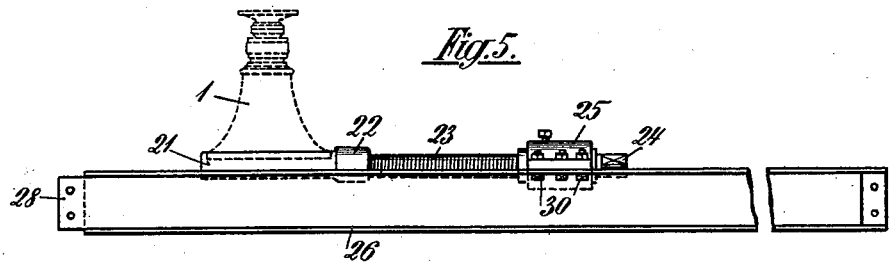
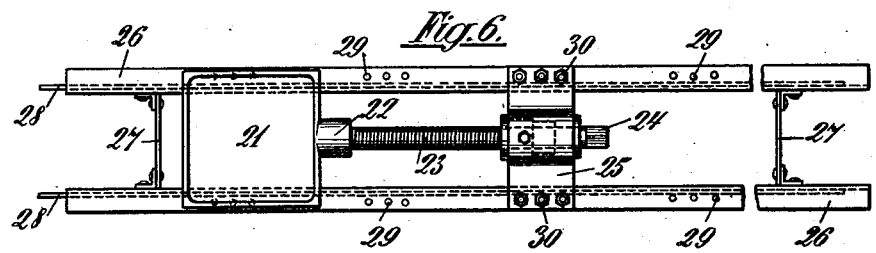
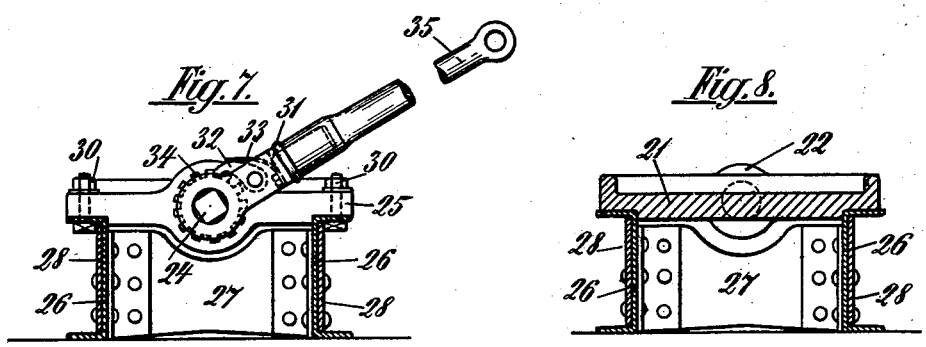
Witnesses: Inventor:
Eugen Rückgauer.
by Max Georgi
his attorney.

UNITED STATES PATENT OFFICE.

EUGEN RÜCKGAUER, OF STUTTGART, GERMANY.

GIN.

SPECIFICATION forming part of Letters Patent No. 714,037, dated November 18, 1902.

Application filed September 13, 1901. Serial No. 75,337. (No model.)

*To all whom it may concern:*

Be it known that I, EUGEN RÜCKGAUER, a citizen of the German Empire, residing at Kriegerstrasse 2, Stuttgart, Germany, have invented certain new and useful Improvements in Gins; and I do hereby declare the following to be a full, clear, and exact description of the invention, such as will enable others skilled in the art to which it appertains to make and use the same.

The present invention relates to a device for lifting and removing heavy weights, such as buildings; and it essentially consists of an apparatus for lifting the weight and of a slide or runway for moving the whole apparatus, together with its load. The way is of such construction that it can be extended at convenience at the right or left hand side by coupling supplementary rails.

My invention will be fully understood with reference to the accompanying drawings, in which—

Figures 1, 2, and 3 represent vertical section, side view, and top view, respectively, of the lifting apparatus; Fig. 4, a horizontal section through A A, Fig. 2. Figs. 5 and 6 show, in vertical section and top view, respectively, the way for removing the lifting device with its load. Fig. 7 is a vertical section through the same, and Fig. 8 the same section through the opposite end. Figs. 9 and 10 illustrate the manner of extending the way laterally.

The apparatus for lifting consists of a strong screw-threaded spindle 3, having a semicircular hollowed head part 4, in which reposes the ball-formed projection 8 of the carrier-plate 7 and which is secured therein by a two-part plate 6, screwed onto the head part 4. The spindle 3 revolves in a box 2, perferably of phosphor-bronze, which is located in a frame 1 and is secured therein by a wedge, spline, or the like. The spindle 3 is rotated by a ratchet-wheel 10, disposed above the adjustment-ring 5 and controlled by the fulcrumed lever 9, whereby it can be rotated to either side by the double-ended pawl 11, pivoted on the bolt 20. For the purpose of governing the pawl 11 the same is provided with a beveled point, against one side of which is pressed a lug 13, which is under the influence of a spring 14. According to the position of this beveled point at the right or left surface of the lug 13 the one or other extremity of the pawl engages in the ratchet-wheel 10. The reversal is effected by hand in turning the pawl, the lug 13 being thereby retracted.

The lever 9 is provided with an extension 15, to which can be inserted the lever 16, by means of which the spindle 3 can be turned. The weight reposes upon the carrier-plate 7 and is prevented from sliding by projecting ribs. Any inclined position of the load will be regulated by the universal joint 8. For lubricating purposes I have provided an inverted-Y-shaped duct, which can be closed normally against dust by a screw 18.

If a weight is merely to be lifted, the apparatus illustrated in Figs. 1 to 4 only is necessary; but if it is desired to move the weight laterally the apparatus 1, with its load, is placed upon the plate 21 of the way and is secured thereon by the upturned flange of this plate. The same runs loosely upon the rails 26 of the way and is guided thereon by a flange at the side thereof. The lateral traction is effected by a screw-threaded spindle 23, the one extremity of which is journaled in the projection 22, attached to the plate, while the other extremity revolves in the interiorly-screw-threaded box of a frame 25, removably fixed upon the rails 26, which are secured together by cross-pieces 27. In order to increase the capacity of the way, iron plates 28, projecting about eighty to one hundred millimeters, are fixed to the sides of the rails, the extremities of said plates being introduced into suitable recesses of the adjacent rails, thus extending the way indefinitely.

In order to allow of the rotation of the spindle 23 for moving the load laterally, the spindle is provided with a ratchet-wheel 34, removably fixed upon the square head 24. A pawl 32 is kept in engagement with this wheel by a spring 33. For working the pawl 32 the same is provided with a lever 35.

When the spindle 23 is turned so far that it cannot be turned more, the screws 30 of the frame 25 are removed and the same is advanced on the ways so that the holes therein register with the next series of holes 29 of the rails 26. The frame is then secured again and the removal of the load continued.

By combining a plurality of such apparatus and ways buildings can be lifted and removed easily.

Having now particularly described and ascertained my invention, what I claim as new, and desire to secure by Letters Patent of the United States, is—

1. The combination with a way, of a platform movably mounted thereon and connected by a threaded traction-screw with a fixed portion thereof, means whereby the said fixed portion may be advanced relative to the rails thus progressively drawing the platform longitudinally of the rails.

2. The combination with a lifting-jack, of a platform adapted to support the jack and provided with an upturned flange to prevent dislodgment of the same, ways supporting the platform and having flanges for guiding the platform for horizontal movement thereon, a traction-screw loosely journaled in the platform and having at its other end threaded engagement with a stationary journal on the ways, said stationary journal removably secured to the ways and susceptible of being advanced relative to the rails and secured again, whereby the platform with its load may be progressively and intermittently drawn along said way.

In testimony whereof I affix my signature in presence of two witnesses.

EUGEN RÜCKGAUER.

Witnesses:
AUGUST DRAUTZ,
RUDOLF HOERZBACH.